United States Patent Office 2,849,750
Patented Sept. 2, 1958

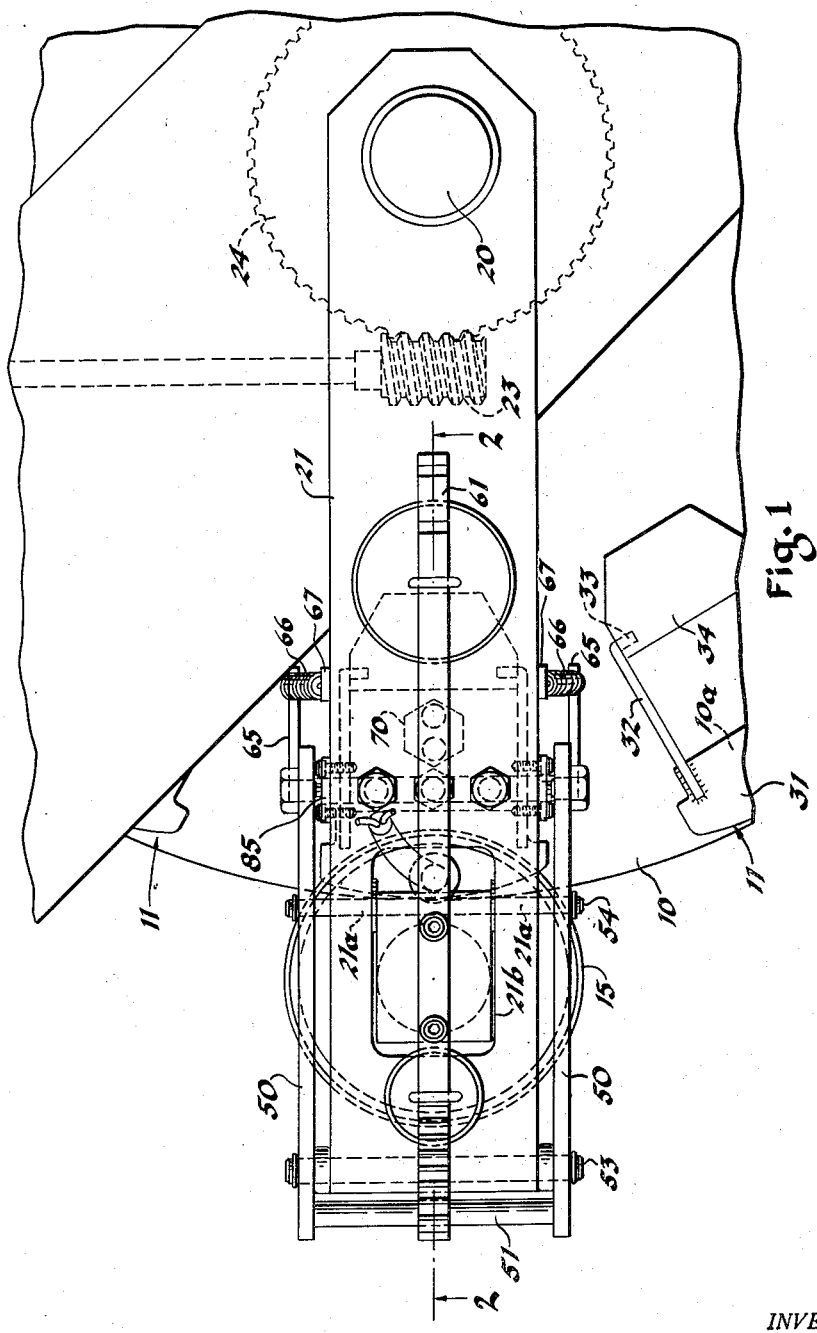

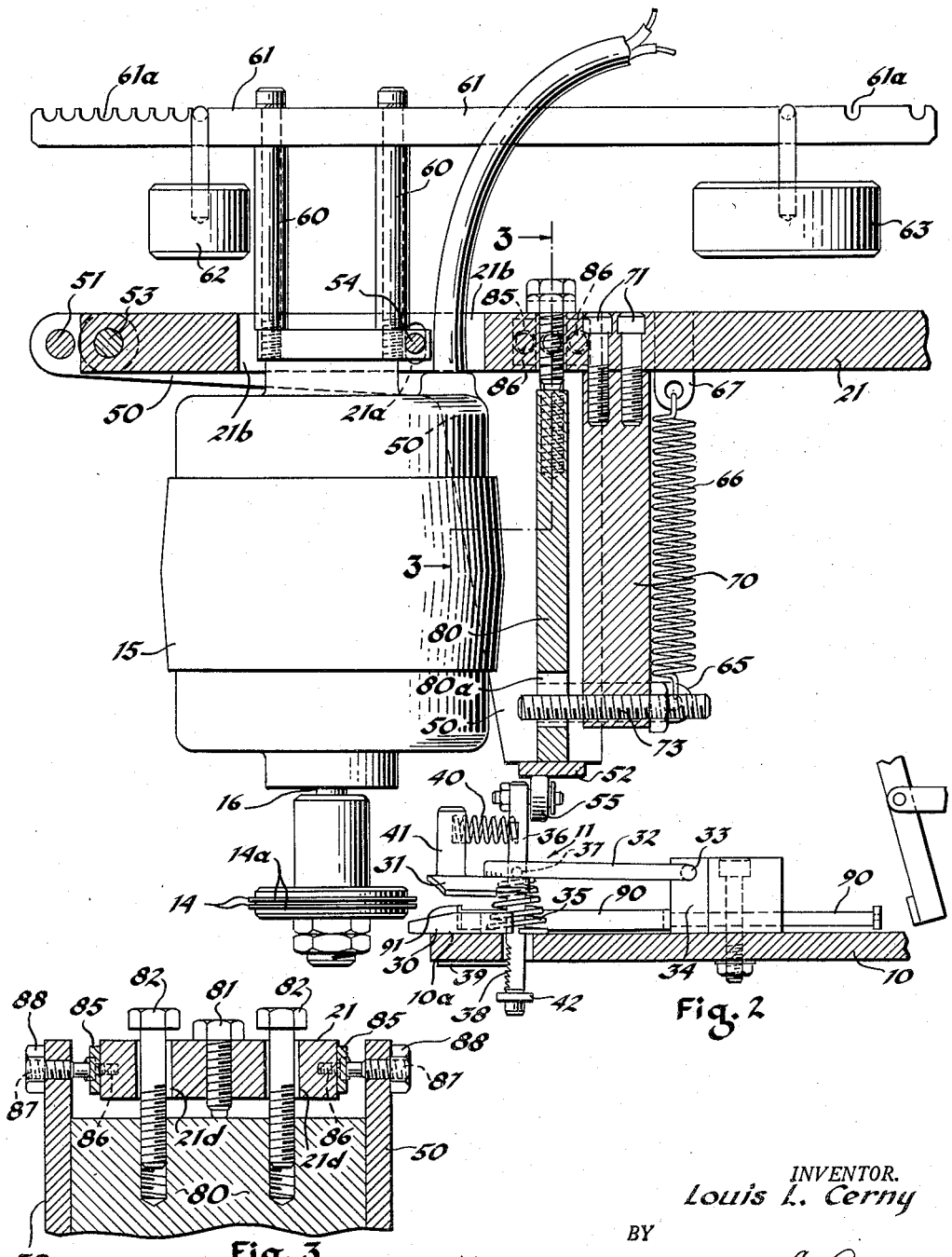

2,849,750

ADJUSTABLE MOUNT FOR SHRIMP DEVEINING SAW

Louis L. Cerny, Cleveland, Ohio, assignor to The Alpha Shrimp Machine Corporation, Cleveland, Ohio, a corporation of Ohio Application January 28, 1954, Serial No. 406,754

7 Claims. (Cl. 17—2)

This invention relates to improvements in an adjustable mounting and more particularly to an adjustable mounting for a shrimp deveining saw.

One of the objects of the present invention is to provide an adjustable mounting between two members whereby the contact between these members is shifted in response to a variation in the size of one of said members.

A further object of the present invention is to provide an apparatus suitable for deveining shrimp by a cutting member wherein the width of the shrimp controls the location of the cutting member so that it will always align with the shrimp vein regardless of the variation in shrimp thickness.

A further object of the present invention is to provide a shrimp deveining machine characterized by its structural simplicity and operating efficiency while being capable of deveining shrimp on a production basis not only with minimum waste of the edible meat therein but also with complete removal of the back vein on each shrimp processed.

Other features of this invention reside in the arrangement and design of the parts for carrying out their appropriate function.

Other objects and advantages of this invention will be apparent from the accompanying drawings and description and the essential features will be set forth in the appended claims.

In the drawings,

Fig. 1 is a partial top plan view of the shrimp deveining apparatus;

Fig. 2 is an enlarged, vertical sectional view thereof taken along the line 2—2 of Fig. 1; while Fig. 3 is a vertical circumferential sectional view through a portion thereof taken along the line 3—3 of Fig. 2.

While this invention might be adapted to various types of machines and used for various purposes, I have chosen to show the same as applied to the shrimp deveining portion of the machine disclosed in the U. S. Patent No. 2,683,281 issued July 13, 1954, and based on copending U. S. patent application, Serial No. 139,862, filed January 21, 1950 by Albert B. Yanus and Louis L. Cerny and entitled "Shrimp Deveining and Deshelling Machine." However, it should be clearly understood that this invention may be used to process workpiece members of other forms in addition to the shrimp being deveined as disclosed herein.

The apparatus in the present application operates basically in the same manner as that in the said patent as to the cleaning of shrimp except as to the deveining constructions described hereinafter and differing from the corresponding construction in said patent. The present apparatus makes it possible to move the deveining saw vertically in response to the shrimp thickness (height in Fig. 2) so that the saw always aligns with the back vein extending along the dorsal side of the shrimp and located centrally thereof, so as to cut the same cleanly from the shrimp regardless of the size of the shrimp.

The common structure in the present application and in said patent will be briefly described. It should also be noticed that Fig. 2 in the present application corresponds to Fig. 5 in said copending application.

A locating means is provided to hold each shrimp or other workpiece member in position for the sawing thereof. This takes the form of a rotatably mounted table 10 having a series of individual clamps 11 secured to and spaced around the table near its outer periphery with each clamp adapted to receive, locate and securely hold one workpiece member or shrimp.

A cutting member is provided for deveining the shrimp or cutting the workpiece member by making contact therewith. This takes the form of a rotatable saw 14 rotatably driven by an electric motor 15 rotatably driving a shaft 16 secured at one end to this saw 14.

The table 10 along with the shrimp or workpiece members carried thereby are movable past the cutting device 14. The mounting means for permitting this relative rotation includes a stationary post 20 having a radially extending arm 21 supporting the saw motor 15. The table 10 is rotatably mounted on the stationary post 20 and is rotatably driven by a worm 23 meshed with and rotatably driving a worm wheel 24. Hence, when each shrimp is secured in its clamp 11 with the portion of its shell enclosing the vein facing outwardly with its length extending circumferentially along the table 10, the rotation of the table 10 will move the shrimp and their veins past the rotating saw 14 so that the full length of each vein will be cut out as the saw moves along the full length dimension of the shrimp. Although the table moves relative to the rotational axis of the saw 14, it should be understood that either may be stationary while the other moves, or both may move as long as one moves relative to the other.

Although any suitable locating or clamping means can be used on table 10, the clamp 11 is disclosed herein. A plurality of shrimp clamps 11 are circumferentially spaced around the outer circular edge of the table 10 by having the lower clamp plate 30 in Fig. 2 of each clamp secured to an annular surface 10a on the top of the rotatable table 10. This clamp plate 30 is so arranged that the shrimp is adapted to be placed with the tail at the leading edge and the body portion toward the trailing edge and the vein will then be held substantially horizontal. Suitable stop members can be provided upstanding from the plate 30 so as to position the thinner portion, or second joint, of the shrimp between the body and the tail against this stop portion in the same manner as described in more detail in said copending patent application. In each shrimp clamp 11, a movable clamp plate 31 is provided to engage the upper side of the shrimp body and wedge it against the lower clamp plate 30. This movable clamp plate 31 has a pair of arms 32 extending radially inwardly and pivotally mounted at pivot 33 in a bracket 34 extending upwardly from and secured to table 10. A conical shaped coil spring 35 located between the movable clamp plate 31 and the table 10 biases this plate 31 upwardly into the open position. A lock pin 36 is pivotally mounted to plate 31 at pivot 37. Below table 10, the radially outermost face of lock pin 36 is provided with a series of fine rachet teeth 38 adapted to engage against a retaining plate 39 secured on the under side of table 10. The teeth 38 are normally urged toward the retaining plate 39 by means of a coil spring 40 which is held between the upper end of lock pin 36 and a bracket 41 upstanding from movable clamp plate 31.

Hence, when the movable clamp plate 31 is clamped down upon the shrimp, one of the rachet teeth 38 will engage the retaining plate 39 to hold the movable clamp plate 31 in clamping position. A stop 42 on lock pin 36 is adapted to engage the underside of table 10 so as to limit the upward movement of the movable clamp plate 31 under the influence of spring 35.

After the shrimp has been properly located on its shrimp clamp 11, the clamp plates 30 and 31 may be closed thereon by moving the movable clamp plate 31 downwardly either manually or automatically by power.

The present invention has several features not disclosed in said copending application.

Means is provided for changing the vertical height of the saw 14 so that it will always align with the shrimp vein at each shrimp clamp 11 regardless of the variations in the size and thickness of the shrimp located on the different shrimp clamps 11. The saw drive motor 15 is not directly fixed to the arm 21 but instead is mounted on a movable support member comprising side pieces 50, 50 in Fig. 2 of generally inverted L-shape joined at their upper left end by a crossbar 51 and at their lower right end by a cross plate 52 to space the side pieces 50, 50 a fixed distance apart. The side pieces 50, 50 are pivotally mounted in straddling relationship by pivot 53 to the distal or radially outermost end of the fixed arm 21 so that the movable support member can swing about this pivot point. The saw motor 15 is pivotally mounted at pivot 54 to the traddling side pieces 50, 50 with the pivot bolt 54 extending through vertically elongated slots 21a and a cutout 21b in the arm 21 to assure sufficient vertical movement of the movable support member. The pivotal axis of these bolts 53 and 54 are parallel.

This movable support member, along with motor 15 and saw 14 are caused to shift vertically by a coacting follower roller 55, rotatably connected to the top of lock pin 36, coacting with the lower surface of connecting plate 52, which acts as a cam surface when coacting with said roller. Hence, the cam, when of proper contour, and follower cause upward vertical movement to the saw 14 while gravity tends to bias the cam surface 52 down against the follower roller 55. Of course, the leading and trailing edges of the cam surface 52 are suitably beveled to capture the follower roller 55 thereunder and to cause smooth operation.

This vertical shifting movement of the saw 14 is responsive to the thickness of the shrimp since the follower roller 55 is operatively connected to the movable clamp plate or jaw 31 through the lock pin 36 and pivot 37. Since the lever arm in Fig. 2 from pivot 53 to the contact between the cam surface 52 and the follower roller 55 is approximately twice the length of the lever arm between pivots 53 and 54, the vertical shift of the saw 14 is approximately one-half the change or variation in the height of the movable clamp plate 31 as determined by the thickness dimension of the shrimp. Since the shrimp vein is always along the middle of the shrimp and is centered as to the thickness dimension thereof, this shifting means will always keep the saw 14 aligned with the vein regardless of the size or thickness variations of the different shrimps being deveined. Each shrimp individually controls the height of the saw 14 during its deveining operation so that the saw will be properly aligned with its vein.

In the present disclosure, the saw shifting means, as described in detail in the previous paragraphs, takes the form wherein the saw type cutting member 14 is the one shifted vertically into a new cutting path relative to the rotating table member 10 and shrimp clamp member 11 with the shift being responsive to the thickness of the workpiece member or shrimp member held in said clamp. The saw 14 has moved along the thickness dimension of the shrimp member during this vertical shift so as to keep the saw 14 aligned with the center of the shrimp thickness during the rotation of the table 10 relative to the generally fixed saw motor 15 regardless of the variations in the thickness of the shrimp. Of course, this invention includes in addition to the preferred embodiment described herebefore other suitable variations in structure coming within the broad scope of the invention. For example, the table member 10 and shrimp locating clamp member 11 may shift vertically relative to the saw member 14 along the width dimension of the shrimp and/or the shrimp clamp 11 may remain relatively stationary as to movement in a horizontal plane while saw member 14 moves along the length of the shrimp for causing relative movement therebetween instead of having the table member 10 rotate about its central, vertical axis. As to this latter movement along the length of the shrimp in a horizontal plane, relative movement therebetween can be obtained by having the axis of rotation of the saw member and having the shrimp clamp member 11 so connected that either one is stationary while the other moves or both move but have a relative speed therebetween.

The saw 14 is constructed to saw into the meat of the shrimp in relationship with the vein therein so that the vein will, or can, easily be removed. Also, the saw includes spaced collars 14a in Fig. 2 in a mounting adaptor for securing the saw to the motor shaft 16. These collars 14a have a smooth, round, cylindrical contour coaxial with the axis of rotation so that as the saw is biased horizontally into the workpiece member or shrimp, the collars 14a will follow the contour of the shrimp shell and control the depth of cut. The saw member 14 is biased or urged into cutting engagement by having the pivot pin 54 located radially inwardly toward the axis of rotation of table 10 (about post 20 in Fig. 1) from a vertical line through the center of gravity of the cutting member including motor 15, shaft 16, saw 14, etc. swinging about pivot 54.

The saw 14 is properly counterbalanced with respect to all of these movements so that the deveining action can take place easily and rapidly during high speed operation of the machine. The weight of the movable members on the distal end of arm 21 is approximately counterbalanced to obtain these desirable results. As to the movement in the horizontal plane for controlling the cutting depth of the saw 14, the pivot 54 is located radially inwardly from the vertical line of action through the center of gravity of the cutting members carried thereby with the posts 60, 60 secured to the upper end of the motor 15 and extending upwardly through the cut-out 21b in the fixed arm 21 at the top of which posts is secured a crossbar 61 carrying appropriate counterbalancing weights 62, 63 in adjustment notches 61a in the upper surface of said crossbar. As to the vertical movement wherein the saw 14 is shifted vertically to follow the shrimp width, a spring counterbalance is provided. Lugs 65, 65 are secured to and project from the right end of the respective side pieces 50, 50 with the distal end of each lug connected by a spring 66 to another lug 67 secured to the fixed arm 21 so as to counterbalance to some degree the gravitational weight of the cutting member motor, etc. It should be also noted that the pivot 54 and the remaining parts of the structure help keep the saw 14 generally horizontal for the proper cutting action in spite of the fact that the vertical shift is generally an arcuate swing about the pivot 53.

Each of these movements has a limit stop. A post 70 is secured to the lower surface of the arm 21 by screws 71 projecting downwardly therefrom. An adjustment screw 73 is screwed into a threaded hole at the lower end of this post 70 with its left end adapted to contact the surface of the motor housing 15 to prevent the saw 14 from swinging inwardly between the clamp jaws 30 and 31 beyond the desired stopping place and thereby damaging the saw, the shrimp locating surface, or other parts of the shrimp clamp 11.

The vertical shifting movement is controlled by having limit stops on both the upper and lower ends of its movement. A plate 80 is secured to the upper surface of cam plate 52 and between side plates 50, 50. It has a suitable vertically elongated slot 80a to permit relative movement with respect to the previously described stop screw 73. The top of this post 80 in Fig. 3 is located some distance below the fixed arm 21 and is also located between the side pieces 50, 50 with which it moves. The upper limit stop for the upward shift takes the form of a screw 81 in Fig. 3 screwed into a threaded hole in fixed arm 21 with its lower end loosely contacting as a stop the upper surface of plate 80. The lower limit stop takes the form of two screws 82, 82 in Fig. 3 telescoped loosely in holes 21d, 21d in the fixed arm 21 with their threads screwed into the threaded holes in the top of plate 80 so that the heads of the screw bolts 82, 82 engage against the top surface of the fixed arm 21 to limit the downward movement.

The pivotally mounted movable support member for the motor 15 can be adjusted laterally with respect to the stationary arm 21. In Fig. 3, plates 85, 85 are suitably secured by spaced screws 86, 86 in Figs. 2 and 3 to the side walls of the fixed arm 21. Adjustment studs 87, 87 are screwed into threaded holes in the straddling side pieces 50, 50 with the inner ends of said studs slidably bearing against the outer surfaces of plates 85, 85 and locked in this position by lock nuts 88, 88. Plates 85 can be of hardened construction to serve as wear plates.

A pusher device 90 may be provided for pushing a shrimp from table 10 to another table when the point of tangency is reached as disclosed in the copending U. S. patent application, Serial No. 384,232, now Patent No. 2,789,309, issued April 23, 1957, entitled "Shrimp Clamp" filed by myself and Albert B. Yanus. Pusher plate 91 on device 90 may serve as the previously mentioned stop member for positioning the shrimp in clamp 11.

Although the preferred construction is herein disclosed as being specially adapted for deveining shrimps, it should be clearly understood that this invention, in its broadest aspects, is capable of other uses wherein the point of contact between the members is controlled by the relative width of the workpiece member. Suitable uses might be marking, sawing, cutting or otherwise processing desired workpiece members.

Various changes in details and arrangement of parts can be made by one skilled in the art without departing from either the spirit of this invention or the scope of the appended claims.

What I claim is:

1. An apparatus adapted for deveining shrimp, a locating means adapted to position a shrimp or other workpiece member, a cutting member for deveining said shrimp or cutting said workpiece member, said cutting member and locating means being mounted so that one moves relative to the other along the length of said workpiece member, means responsive to the thickness of said workpiece member for shifting at least one of said members to move said cutting member along the width of said workpiece member to keep the cutting member aligned with approximately the center of said width during said relative movement regardless of the variations in width of said workpiece member, means operable independently of said shifting means for urging said members together into cutting engagement, and means operatively connecting said locating means, said cutting member, said thickness responsive means and said urging means.

2. An apparatus adapted for deveining shrimp, a locating means adapted to position a shrimp or other workpiece member, a cutting member for deveining said shrimp or cutting said workpiece member, said cutting member and locating means being mounted so that one moves relative to the other along the length of said workpiece member, means responsive to the thickness of said workpiece member for shifting at least one of said members to move said cutting member along the width of said workpiece member to keep the cutting member aligned with the center of said width during said relative movement regardless of the variations in width of said workpiece member, said cutting member being the one shifted and urged into a new path of relative movement, said cutting member including a saw and a motor driving said saw, counterbalance means to approximately balance the weight of said cutting member so that the shifting and urging can take place easily and rapidly during high speed operation, and means operatively connecting said locating means, said cutting member, said counterbalance means and said thickness responsive means.

3. An apparatus, comprising an arm, a movable support member pivotally connected to said arm for movement about a horizontal axis, a motor driven saw pivotally mounted on said support member on an axis parallel to said first named axis and having a center of gravity located to one side of said pivotal mounting so that the saw always maintains approximately the same tilt with the horizontal, and an actuating portion on said support member adapted to be moved so as to swing said support member about said first mentioned pivot, the distance from said first mentioned pivot to said actuating portion being in predetermined ratio to the distance between said pivots.

4. An apparatus, as set forth in claim 3, wherein said predetermined ratio of said recited distances is approximately 2:1 with said first mentioned pivot and actuating portion being on opposite sides of the vertical action line through the center of gravity.

5. In combination, a first member adapted to contact sequentially individual workpieces in a series of aligned workpieces forming a second member, mounting means for operatively connecting said members for movement one relative to the other along one dimension of said aligned workpiece members while said first member is urged into sequential engagement with each of said workpieces during said movement, said mounting means including means for shifting one of said members a distance relative to the other along a second dimension of the engaged workpiece angularly disposed with respect to said first dimension with said shifting means being responsive to said second dimension of said engaged workpiece and with said distance being always equal to approximately one-half the change in said second dimension of the engaged workpiece, and means operatively connecting said first member, said mounting means and said shifting means of said mounting means, whereby said contacting engagement of each workpiece will occur in the middle of the second dimension even though the workpieces may vary in size in the second dimensions.

6. An apparatus adapted for deveining shrimp, a locating means adapted to position a shrimp or other workpiece member, a cutting member for deveining said shrimp or cutting said workpiece member, said cutting member and locating means being mounted so that one moves relative to the other along the length of said workpiece member, means responsive to the thickness of said workpiece member for shifting at least one of said members to move said cutting member along the width of said workpiece member to keep the cutting member aligned with approximately the center of said width during said relative movement regardless of the variations in width of said workpiece member, and means operatively connecting said locating means, said cutting member and said thickness responsive means, said locating means having a generally planar surface against which said shrimp or workpiece member rests, said thickness responsive means including means directly responsive to the distance measured perpendicularly from said planar surface for moving said cutting member only one-half the change in said distance.

7. In combination, a first member adapted to contact a workpiece member, mounting means for operatively connecting said members for movement one relative to the other along one dimension of said workpiece member while said members are urged into contacting engagement, said mounting means including means for shifting one of said members a distance relative to the other along a second dimension of said workpiece member angularly disposed with respect to said first dimension with said shifting means being responsive to said second dimension and with said distance being always equal to approximately a predetermined proportionate amount of the change in said second dimension, said mounting means including urging means for urging said members into contact independently of said shifting means, and means operatively connecting said first member, said mounting means, said shifting means and urging means of said mounting means.

References Cited in the file of this patent

UNITED STATES PATENTS

| | | |
|---|---|---|
| 898,289 | Voorhies | Sept. 8, 1908 |
| 2,393,617 | DeSpain | Jan. 29, 1946 |
| 2,568,947 | Carroll | Sept. 25, 1951 |
| 2,599,712 | Izen | June 10, 1952 |
| 2,683,281 | Yanus et al. | July 13, 1954 |